US006295809B1

United States Patent
Hammerle et al.

(10) Patent No.: US 6,295,809 B1
(45) Date of Patent: Oct. 2, 2001

(54) EMISSION CONTROL SYSTEM WITH A CATALYST

(75) Inventors: Robert Henry Hammerle, Franklin; Karen Marie Adams, Dearborn Heights; Paul Matthew Laing, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/353,294

(22) Filed: Jul. 12, 1999

(51) Int. Cl.[7] .................................................. F01N 3/00
(52) U.S. Cl. ............................ 60/286; 60/274; 60/295; 60/301; 423/219; 423/235; 423/239.1
(58) Field of Search ...................... 60/274, 286, 301, 60/295; 423/219, 235, 239.1; 436/55

(56) References Cited

U.S. PATENT DOCUMENTS

| 4,403,473 | 9/1983 | Gladden . | |
|---|---|---|---|
| 4,751,054 | 6/1988 | Watanabe . | |
| 4,854,123 | 8/1989 | Inoue . | |
| 4,963,332 | * 10/1990 | Brand et al. | 423/235 |
| 5,021,227 | * 6/1991 | Kobayashi et al. | 423/212 |
| 5,233,934 | 8/1993 | Krigmont et al. . | |
| 5,369,956 | 12/1994 | Daudel et al. . | |
| 5,540,047 | 7/1996 | Dahlheim et al. . | |
| 5,628,186 | * 5/1997 | Schmelz | 60/274 |
| 5,845,487 | 12/1998 | Fraenkle et al. . | |
| 5,849,593 | * 12/1998 | Schmelz | 436/55 |
| 6,004,524 | * 12/1999 | Morsbach et al. | 423/239.1 |
| 6,125,629 | * 10/2000 | Patchett | 60/286 |

FOREIGN PATENT DOCUMENTS

| 355093917A | * 7/1980 | (JP) | 60/286 |
|---|---|---|---|
| 410212931A | * 8/1998 | (JP) . | |

* cited by examiner

Primary Examiner—Thomas Denion
(74) Attorney, Agent, or Firm—John D. Russell

(57) ABSTRACT

A reductant injection control strategy for controlling an amount of nitrogen oxide reducing agent injected upstream of a selective reduction catalyst uses an ammonia sensor located downstream of the catalyst. An open loop injection quantity is first determined based on operation conditions. Ammonia concentration detected downstream of the catalyst is controlled to a desired value, with the desired value based on catalyst temperature and the open loop injection quantity.

8 Claims, 3 Drawing Sheets

EMISSION CONTROL SYSTEM WITH A CATALYST

FIELD OF THE INVENTION

The invention relates to a system and method for controlling ammonia injection upstream of a selective reduction catalyst for use with an internal combustion engine.

BACKGROUND OF THE INVENTION

In order to meet some emission regulations, selective catalytic reduction systems using externally added reducing agents may be used. In such a system, regulated emissions, such as certain nitrogen oxides, or NOx, can be reduced in a oxygen-rich environment to nitrogen and water over a catalyst when a reducing agent, such as ammonia, is added. In addition to controlling nitrogen oxide emissions, the amount of excess ammonia, or ammonia slip, must be managed. Ammonia slip is experienced when ammonia in excess of that used to reduce the nitrogen oxides passes through the catalyst unaffected and exits the catalyst (as ammonia slip).

One method for regulating ammonia slip is to use an ammonia sensor located downstream of the catalyst. The detected ammonia concentration is compared with a fixed upper threshold value. This comparison generates a correction signal that is used to control the metering of ammonia upstream of the catalyst. Allegedly, by regulating actual ammonia slip to the upper threshold value, a certain nitrogen oxide reduction is obtained. Such a system is disclosed in U.S. Pat. No. 5,369,956.

The inventors herein have recognized a disadvantage with the above system. The above system regulates to a fixed concentration value for the upper threshold ammonia slip. However, this system does not consider NOx conversion efficiency or percentage slip. While $NH_3$ slip expressed as concentration (ppm) and as a percent are related, there is an important distinction in their use for reductant control strategy. In general, as maximum NOx conversion is approached with increasing ammonia addition (i.e., increasing $NH_3$/NOx mole ratio), ammonia starts to slip. After maximum NOx conversion is attained, ammonia slip increases more rapidly with increasing $NH_3$/NOx. For example, if ammonia slip is regulated to a constant concentration value, an ammonia setting high enough for sufficient NOx conversion at high NOx feed gas levels is likely excessive for low NOx feed gas levels, thereby wasting ammonia. Conversely, a setting at minimum detectable ammonia concentration is likely insufficient to provide high NOx conversion at high NOx feed gas levels. Further, intermediate settings may still be insufficient to provide high enough NOx conversion at high NOx feed gas levels. Thus, prior approaches can not achieve high NOx conversion with minimal ammonia slip, particularly for vehicle engines where NOx concentration levels varies widely and quickly.

In other words, because a catalyst experiences widely varying levels of engine NOx, controlling to an ammonia slip concentration results in widely varying, and less than optimum, NOx conversion efficiency.

SUMMARY OF THE INVENTION

An object of the invention claimed herein is to provide a system and method for controlling ammonia injection upstream of a selective reduction catalyst using an ammonia sensor located downstream of the catalyst to keep ammonia slip low while achieving a high level of NOx conversion.

The above object is achieved and disadvantages of prior approaches overcome by a method for controlling a reductant injection into a catalyst coupled to an internal combustion engine, the method comprising the steps of: determining a temperature region in which the catalyst is operating; generating a reductant injection quantity based on engine operating conditions; generating a desired reductant slip based on a catalyst temperature and said reductant injection quantity; and adjusting said reductant injection quantity so that an actual reductant slip approaches said desired reductant slip.

By regulating reductant slip to a desired value that is a fraction of injected reductant, NOx conversion efficiency is kept high and more consistent throughout widely varying NOx concentration levels typical for diesel vehicles. Further, since the desired ammonia slip value is also based on temperature, this additionally improves NOx conversion.

It is therefore possible to control ammonia slip with improved NOx reduction, particularly for vehicle engines where NOx concentration levels varies widely and quickly. In other words, when ammonia slip is regulated to a fraction of injected reductant, or ammonia, high NOx conversion is provided without excessive slip throughout the widely varying NOx feed gas concentrations.

An advantage of the present invention is improved NOx conversion while keeping ammonia slip low.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT

Figure 1:
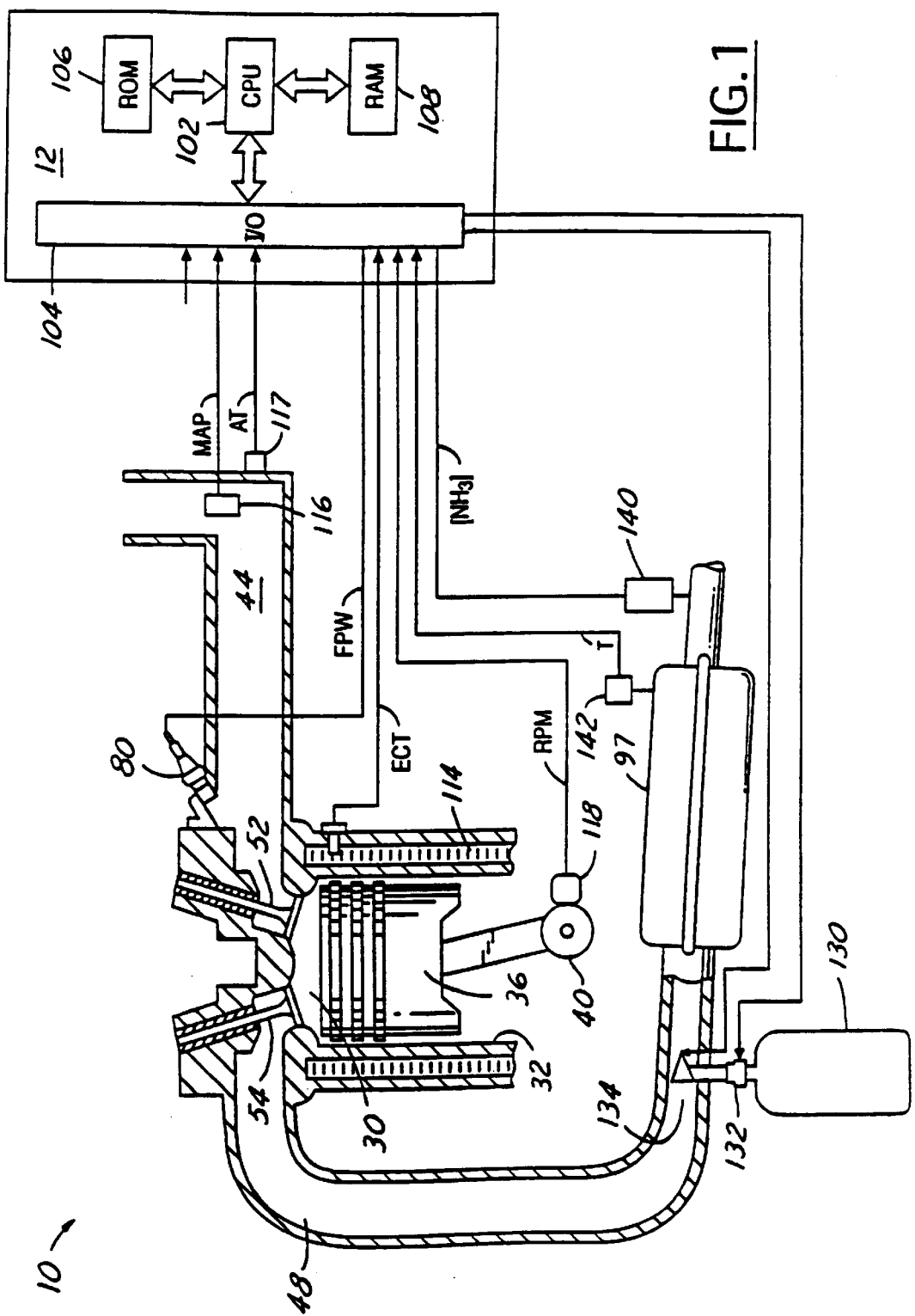
FIG. 1 is a block diagram of an embodiment wherein the invention is used to advantage.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a conventional fuel system (not shown) including a fuel tank, fuel pump, and fuel rail (not shown). Alternatively, the engine may be configured such that the fuel is injected directly into the cylinder of the engine, which is known to those skilled in the art as a direct injection engine.

Reducing agent, for example, ammonia, is stored in storage vessel 130 coupled to exhaust manifold 48 upstream of catalyst 97. Control valve 134 controls the quantity of reducing agent delivered to the exhaust gases entering catalyst 97. Pump 132 pressurizes the reducing agent supplied to control valve 134. Both Pump 132 and control valve 134 are controlled by controller 12. Ammonia sensor 140 is shown coupled to exhaust manifold 48 downstream of catalyst 97. Temperature sensor 142 coupled to catalyst 97 provides an indication of the temperature (T) of catalyst 97. Alternatively, catalyst temperature (T) could be estimated using methods known to those skilled in the art and suggested by this disclosure. Ammonia sensor 140 provides an indication of ammonia concentration [$NH_3$] to controller 12 for determining a control signal sent to control valve 134 as described later herein with particular reference to FIGS. 2–3.

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

Figure 2:
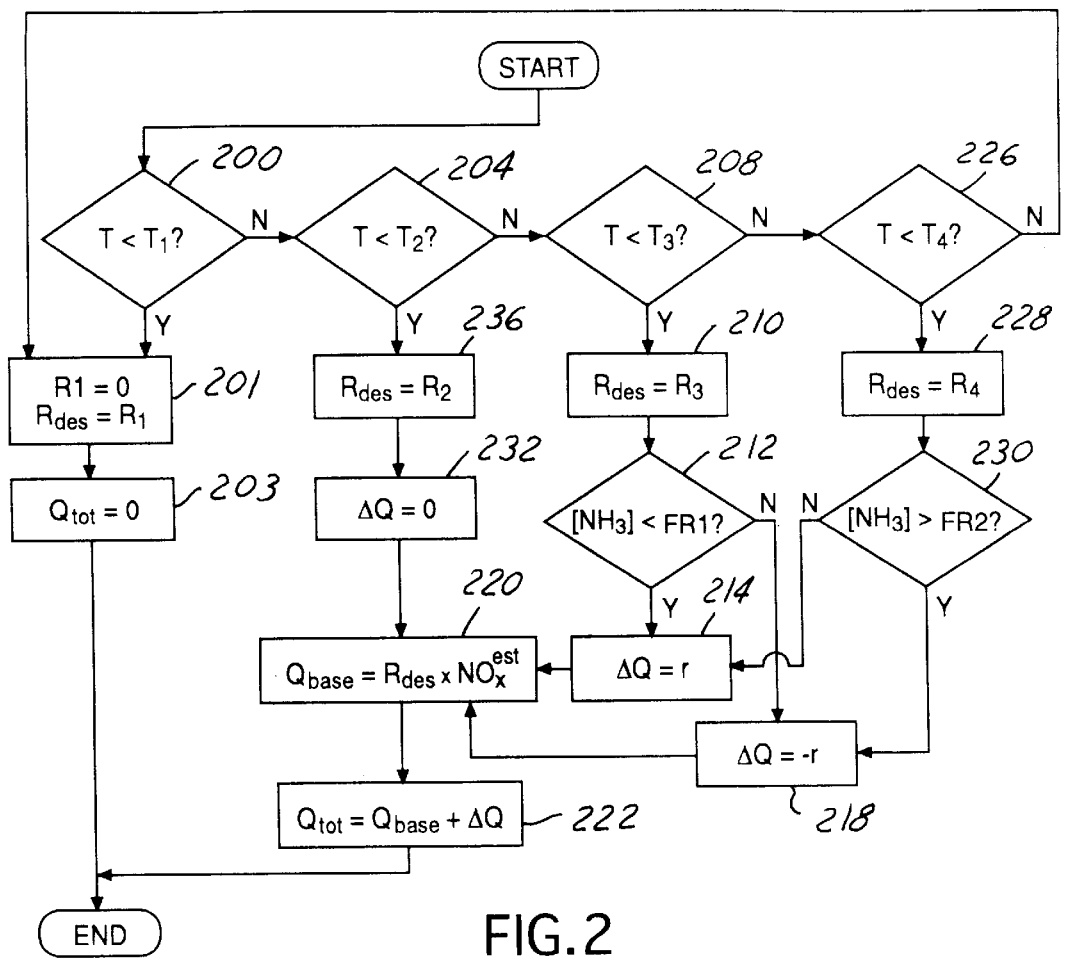
FIGS. 2–3 are high level flow charts of various operations performed by a portion of the embodiment shown in FIG. 1.

Referring now to FIG. 2, a routine for determining a control signal for control valve 134 for controlling reductant addition is described. Reductant is ammonia in a preferred embodiment, but can be any nitrogen (N) containing substance, such as, for example, urea. During step 200, a determination is made as to whether temperature (T) of catalyst 97 is below first threshold temperature T1. Calculation of first threshold temperature T1 is described later herein with particular reference to FIG. 3. When the answer to step 200 is YES, the desired mole ratio (Rdes) is set to zero in step 201 and the total quantity of reductant (Qtot) to be injected by control valve 134 is set to zero in step 203. Thus no reductant is added to the exhaust gases entering catalyst 97 to give a mole ratio (R) equal to first desired mole Ratio (R1) of zero.

Mole ratio (R) is the ratio of the number of moles of nitrogen (N) in the reductant to the number of moles of nitrogen oxide in engine out exhaust gas. The moles of nitrogen oxide in engine out exhaust gas is calculated based on experimentally determined relationships between nitrogen oxide quantity and engine operating conditions known to those skilled in the art to be indicative of estimated engine out nitrogen oxide quantity ($Nox^{est}$) such as, for example, engine speed, manifold pressure (MAP), intake air temperature (AT), injection timing, injection quantity (FPW), and engine coolant temperature (ECT).

When the answer to step 200 is NO, a determination is made in step 204 as to whether temperature (T) is below second threshold temperature T2. Calculation of second threshold temperature T2 is described later herein with particular reference to FIG. 3.

When the answer to step 204 is NO, a determination is made in step 208 as to whether temperature (T) is below third threshold temperature T3. Calculation of third threshold temperature T3 is described later herein with particular reference to FIG. 3. When the answer to step 208 is YES, the desired mole ratio (Rdes) is set to third desired mole ratio (R3) in step 210. Then, in step 212, a determination is made as to whether the measured ammonia concentration from sensor 140 is less than limit amount FR1. First limit amount FR1 is based on a fraction of reductant quantity previously injected. Further, first limit amount FR1 is determined for the specific temperature range. Alternatively, first limit amount FR1 can be a ratio of ammonia slip concentration to engine out (or catalyst-in) NOx quantity. Thus, according to the present invention, the ammonia slip is kept within a limit where the limit is a fraction of the amount of injected reductant.

Continuing with FIG. 2, if the answer to step 212 is YES, then in step 214, adjusted reductant quantity (DQ) is set to a positive calibration amount (r). If the answer to step 212 is NO, then in step 218 adjusted reductant quantity (DQ) is set to a negative calibration amount (−r). Then, from either step 214 or 218, the base reductant quantity (Qbase) is determined from the product of the desired mole ratio (Rdes) and the estimated engine nitrogen oxide production ($Nox^{est}$) in step 220.

When the answer to step 208 is NO, a determination is made in step 226 as to whether temperature (T) is below fourth threshold temperature T4. Calculation of fourth threshold temperature T4 is described later herein with particular reference to FIG. 3. When the answer in step 226 is YES, the desired mole ratio (Rdes) is set to fourth desired mole ratio (R4) in step 228. Then, a determination is made in step 230 as to whether the measured ammonia concentration from sensor 140 is greater than second limit amount FR2. Limit amount FR2 is calculated as a second fraction of reductant quantity previously injected. In a preferred embodiment, second limit amount FR2 is less than first limit amount FR1. In an alternative embodiment, limit amounts FR1 and FR2 can be set to constant levels or adjusted to give a specified parts per million (ppm) of ammonia slip. Further, if urea were used in place of ammonia, appropriate adjustment of the fractions is needed to account for the different molecular structure. Alternatively, second limit amount FR2 can also be a ratio of ammonia slip concentration to engine out (or catalyst-in) NOx concentration. According to the present invention, different limit amounts (FR1 and FR2) are used in different temperature ranges to maximize NOx conversion and minimize ammonia slip.

Continuing with FIG. 2, if the answer to step 230 is YES, then in step 218 adjusted reductant quantity (DQ) is set to a negative calibration amount (−r). Otherwise, adjusted reductant quantity (DQ) is set to a positive calibration amount (−r) in step 214.

When the answer to step 204 is YES, the desired mole ratio (Rdes) is set to second desired mole ratio (R2) in step 236. Then in step 232 adjusted reductant quantity (DQ) is set zero. Then, base reductant quantity (Qbase) is determined from the product of the desired mole ratio (Rdes) and the estimated engine nitrogen oxide production ($Nox^{est}$) in step 220. Then, in step 222, total desired reductant quantity (Qtot) is determined from the sum of the base reductant quantity (Qbase) and the adjusted reductant quantity (DQ). The total desired reductant quantity (Qtot) is converted to a control signal sent to control valve 134 for delivering the reductant in proportional thereto.

In this way, open loop reductant control is used to calculated the base reductant quantity (Qbase) from the product of the desired mole ratio (Rdes) and the estimated engine nitrogen oxide quantity ($Nox^{est}$). Also, desired mole ratio is adjusted based on catalyst temperature (T) to account for changes in catalyst efficiency.

Adjustment is made to this open loop value in two temperature ranges when the measured ammonia concentration from sensor 140 deviates from a desired value based on a fraction of reductant injection. Limit values FR1 and FR2 represent the allowable limits of ammonia slip. Thus, the reductant is controlled for maximum nitrogen oxide conversion with minimum slip. In an alternative embodiment (not shown), different calibration amounts can be used in different temperature ranges. Further, positive and negative calibration amounts can be different (not shown).

Figure 3:
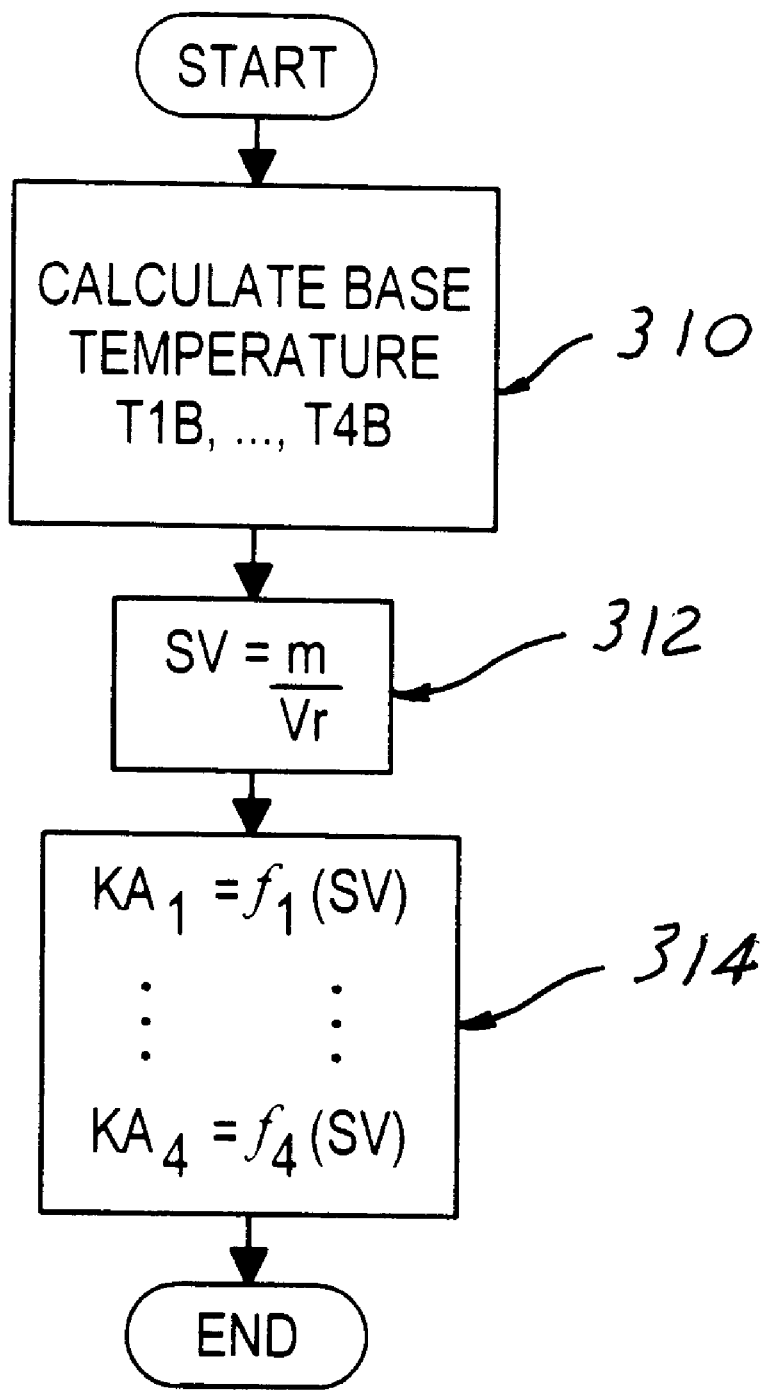

Referring now to FIG. 3, a routine for calculating temperature thresholds is now described. First based temperatures (T1B, ..., T4B) are determined based on predetermined calibration values in step 310. Then in step 312, the space velocity (SV) of the exhaust gas flow entering catalyst 97 is calculated based on the mass flow rate (m), density (r), and catalyst Volume (V). Then, in step 314, adjustment values, (KA1, ..., KA4), are determined based on space velocity (SV) of the flow entering catalyst 97 and calibration functions (f1 ... f4). In a preferred embodiment, functions f1 ... f4 act to reduce temperatures as space velocity decreases and increase temperatures as space velocity increases.

Although one example of an embodiment which practices the invention has been described herein, there are numerous other examples which could also be described. For example, the invention may be used to advantage with both lean burning diesel and gasoline engines in which nitrogen oxide emissions are produced. Further, the present invention can be used in diagnostic applications where the The invention is therefore to be defined only in accordance with the following claims.

We claim:

1. A method for controlling a reductant injection into a catalyst coupled to an internal combustion engine, the method comprising:

determining a temperature region in which the catalyst is operating;

generating a reductant injection quantity based on engine operating conditions;

generating a desired reductant slip based on a catalyst temperature and said reductant injection quantity; and adjusting said reductant injection quantity so that an actual reductant slip approaches said desired reductant slip, wherein adjusting said reductant injection quantity further comprises determining said actual reductant slip based on a sensor located downstream of the catalyst, and decreasing said reductant infection quantity when said actual reductant slip is greater than said desired reductant slip.

2. The method recited in claim 3 wherein the reductant is any ammonia generating material.

3. The method recited in claim 3 wherein said step of generating said desired value of reductant slip further comprises generating said desired value of reductant slip based on a fraction of said reductant injection quantity.

4. The method recited in claim 3 further comprising the step of generating said desired value of reductant slip based on Nox generated by the engine.

5. The method recited in claim 3 wherein said fraction is based on said catalyst temperature.

6. The method recited in claim 3 wherein said step of generating said reductant injection quantity further comprises the step of generating said reductant injection quantity based on a catalyst temperature and a fraction of an engine out nitrogen oxide production.

7. The method recited in claim 3 further comprising the step of discontinuing said adjustment step based on whether said catalyst temperature is within temperature limits.

8. The method recited in claim 7 wherein said step temperature limits are based on exhaust gas space velocity.

* * * * *

UNITED STATES PATENT AND TRADEMARK OFFICE
CERTIFICATE OF CORRECTION

PATENT NO.   : 6,295,809 B1                                                          Page 1 of 1
DATED        : October 2, 2001
INVENTOR(S)  : Robert H. Hammerle et al.

It is certified that error appears in the above-identified patent and that said Letters Patent is hereby corrected as shown below:

Column 6,
Lines 12-33, please correct claims 2-7 as follows:
2. The method recited in claim 1 wherein the reductant is any ammonia generating material.
3. The method recited in claim 1 wherein said step of generating said desired value of reductant slip further comprises generating said desired value of reductant slip based on a fraction of said reductant injection quantity.
4. The method recited in claim 1 further comprising the step of generating said desired value of reductant slip based on Nox generated by the engine.
5. The method recited in claim 1 wherein said fraction is based on said catalyst temperature.
6. The method recited in claim 1 wherein said step of generating said reductant injection quantity further comprises the step of generating said reductant injection quantity based on a catalyst temperature and a fraction of an engine out nitrogen oxide production.
7. The method recited in claim 1 further comprising the step of discontinuing said adjustment step based on whether said catalyst temperature is within temperature limits.

Signed and Sealed this

Twenty-sixth Day of November, 2002

Attest:

Attesting Officer

JAMES E. ROGAN
*Director of the United States Patent and Trademark Office*